C. J. ERICSON.
HAT AND COAT HOOK.
APPLICATION FILED DEC. 18, 1907.
910,051.
Patented Jan. 19, 1909.
2 SHEETS—SHEET 1.
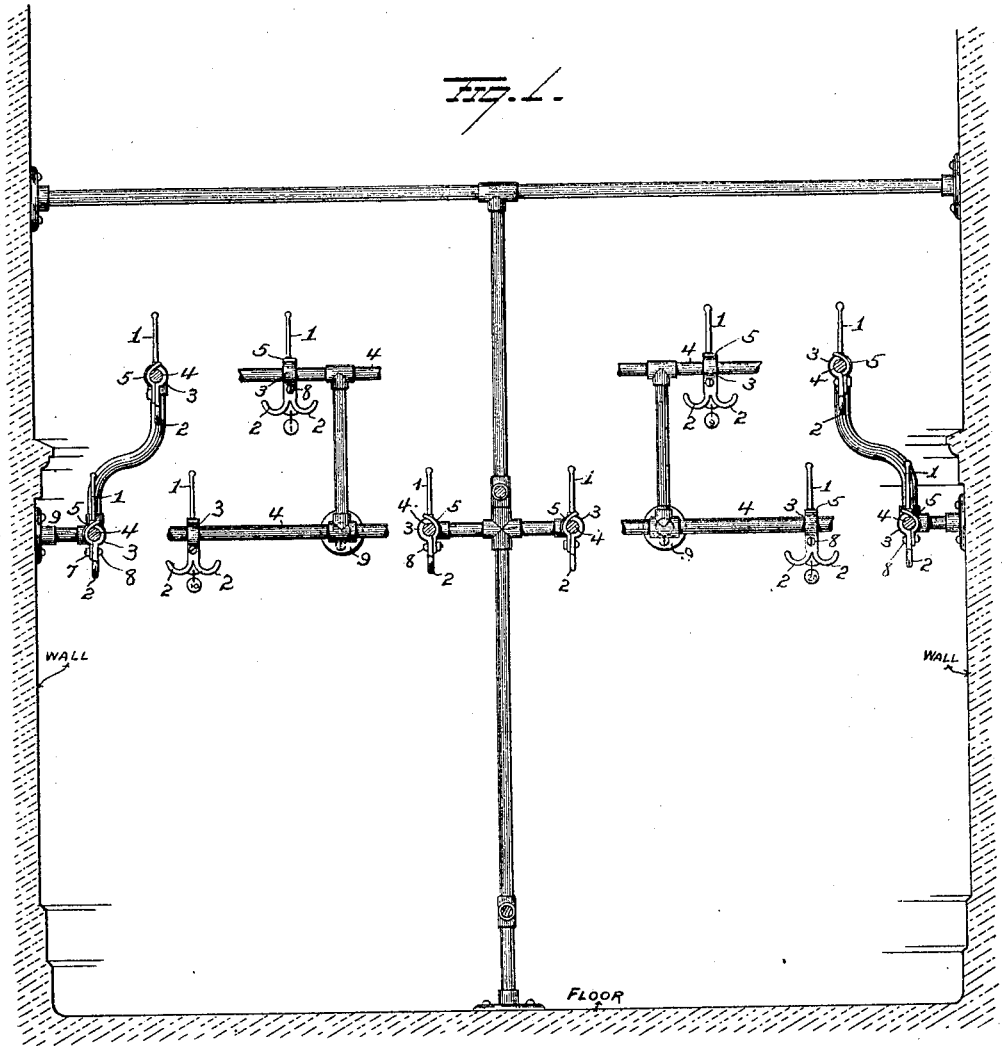
WITNESSES
INVENTOR
C. J. Ericson
By H. A. Seymour
Attorney

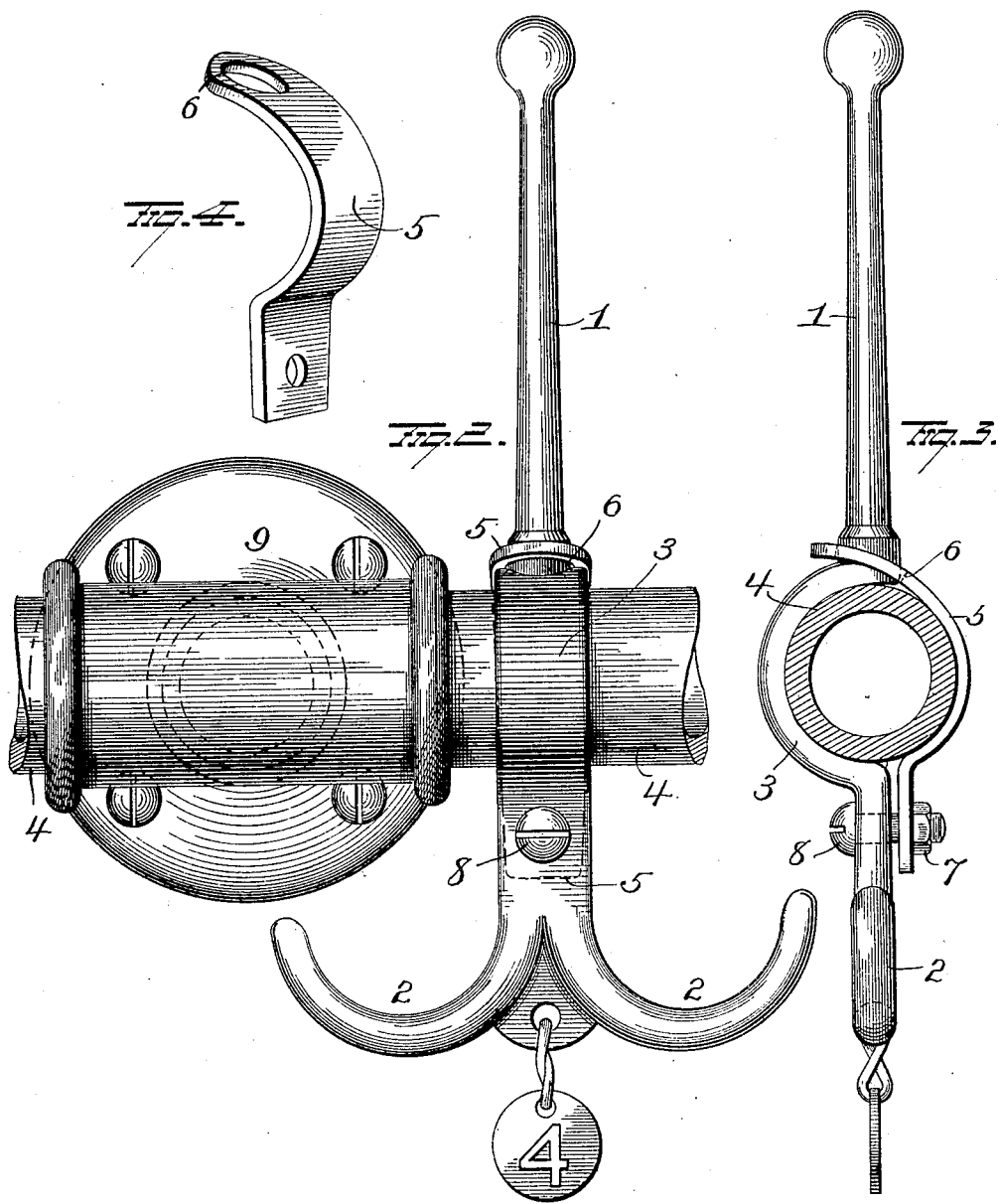

UNITED STATES PATENT OFFICE.

CHARLES J. ERICSON, OF SALT LAKE CITY, UTAH.

HAT AND COAT HOOK.

No. 910,051.     Specification of Letters Patent.     Patented Jan. 19, 1909.

Application filed December 18, 1907. Serial No. 407,082.

*To all whom it may concern:*

Be it known that I, CHARLES J. ERICSON, of Salt Lake City, in the county of Salt Lake and State of Utah, have invented certain new and useful Improvements in Hat and Coat Hooks; and I do hereby declare the following to be a full, clear, and exact description of the invention, such as will enable others skilled in the art to which it appertains to make and use the same.

My invention relates to an improvement in combined hat and coat hooks designed especially for use in schools, or other public buildings, or halls, where a number are used within a limited space.

The object of the invention is to provide a hook made in sections, adapted to be clamped to the supporting rail, thereby permitting any number to be used and accurately spaced and readjusted, without cutting into or disfiguring the rail.

My invention consists in the parts and combination of parts and in the details of construction as will be more fully explained and pointed out in the claims.

In the accompanying drawings, Figure 1 is a view showing the manner of arranging the hooks in a closet. Fig. 2 is a view in elevation of a section of pipe with a hook thereon. Fig. 3 is a view in transverse section of the pipe showing the hook and its securing clip and Fig. 4 is a detached view of the securing clip.

The hook consists of the upright standard 1 terminating in a rounded or blunt upper end, (single or twin) hooks 2 and an intermediate or semi-circular section 3, the latter being of a size to fit a standard size pipe 4.

This hook is preferably made of cast metal, and is secured to a wood rail, or pipe 4 by the clip 5 preferably shaped as shown in Figs. 3 and 4, and provided at one end with an opening 6 and at its opposite end with an opening for the passage of a screw 8 the latter being held in place by a nut 7.

Instead of providing the clip with the threaded hole to receive the screw, the screw may pass through the clip and engage a threaded hole in the hook just below the curved portion 3 thereof, or a bolt may be passed through clip and hook and be secured by a nut.

To secure the hook in place the upper section 1 thereof is passed through opening 6 in the clip and the latter moved to the position shown in Fig. 3, the curved body portion of the hook being placed on the pipe, before or after the strip has been placed on the hook. After the parts have been thus assembled they are secured in place by the screw 8 which firmly binds or clamps the hooks to the rod or pipe.

A pipe containing a number of the hooks may be secured to a wall or other support, by suitable brackets and elbows 9 which hold the rail parallel to the wall or other support, or parallel to another rail secured to the opposite side of the support, thereby holding the clothing out of contact with the wall, or out of contact with clothing on the other series of hooks.

By means of the clip 5 the hook is clamped to the rail by a single screw or bolt, and without cutting or disfiguring the rail or pipe, thus effecting a great saving in time and expense in mounting the hooks, and particularly so in schools or buildings where a large number of hooks are necessary and used. Again by my improved means for clamping the hooks the position of the latter may be re-adjusted without marring or defacing the pipe. Another advantage of my improvement is that the pipe 4 separates the hat which is carried on section 1, from the clothing suspended from the hook 2 thus making it more sanitary than the hook now in common use.

The hooks are made to fit standard sizes of pipe, so that the pipes or rails may be put up of standard stock during the construction of the building, the hooks being attached later on while other hardware is being placed.

Clips 5 may be made of cast metal, but I prefer to make them of wrought sheet steel, brass or bronze, which will give or yield, and thus be less liable to break the hook during the clamping operation than if both parts were of cast iron of equal temper.

The hooks are each provided at its bottom with a hole for the attachment of a numbered tag which may correspond with the seats in the school room, or which may be given out as a check.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. As a new article of manufacture, a hook having a semi-circular section and garment holding members, a clip embracing said hook adjacent to the juncture of one of said garment holding members and the semi-circular section, and means for locking the opposite end of the clip to the hook adjacent to the other end of the semi-circular section.

2. The combination with a supporting rail, of a hook having a section shaped to embrace one side of said rail, and a securing clip for embracing the opposite side of the rail, the said clip having a loop at one end permitting the passage through it of the hook and a screw for detachably securing the opposite end of the clip to the hook.

3. The combination with a rail, of a hook comprising a standard, a hook, and an intermediate curved body portion for embracing one side of the rail, a clip embracing the opposite side of the rail, the said clip having an opening at one end for the passage of the standard, and a screw hole at its opposite end and a screw passing through said screw hole and engaging the body of the hook for locking the hook and clip to the rail.

4. The combination with a rail, of a plurality of hooks each having an upwardly projecting standard, depending hooks and an intermediate body portion, the latter being curved to conform to the contour of the rail, and a clip the latter being curved to conform to the contour of the rail, the said clip having an opening for the passage of the upright standard, and a screw for detachably securing the opposite end of the clip to the body hook.

5. A device of the character described, comprising a body portion adapted to conform to a support, a standard rising from said body portion, a hook depending from said body portion, a clip embracing the standard at its juncture with the body portion, and means for securing the lower end of said clip above the depending hook and below the support to which the device may be attached.

In testimony whereof, I have signed this specification in the presence of two subscribing witnesses.

CHARLES J. ERICSON.

Witnesses:
HAMPDEN S. BEATIE,
CLAUDE CLIVE.